(12) United States Patent
Prismon et al.

(10) Patent No.: US 10,620,944 B2
(45) Date of Patent: *Apr. 14, 2020

(54) CLOUD-BASED DECISION MANAGEMENT PLATFORM

(71) Applicant: FAIR ISAAC CORPORATION, Roseville, MN (US)

(72) Inventors: Joshua Prismon, Lafayette, CO (US); Andrei Palskoi, Parkland, FL (US); John Daniel Cribbs, San Jose, CA (US); Fernando Felipe Campos Donati Jorge, Saratoga, CA (US); Stuart Clarkson Wells, Sunnyvale, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,693

(22) Filed: Jun. 23, 2017

(65) Prior Publication Data

US 2017/0286102 A1 Oct. 5, 2017

Related U.S. Application Data

(63) Continuation of application No. 14/592,353, filed on Jan. 8, 2015, now Pat. No. 9,690,575.

(Continued)

(51) Int. Cl.
*G06F 8/36* (2018.01)
*G06F 8/71* (2018.01)
(Continued)

(52) U.S. Cl.
CPC .............. *G06F 8/71* (2013.01); *G06F 8/34* (2013.01); *G06F 8/35* (2013.01); *G06F 8/36* (2013.01); *H04L 67/10* (2013.01); *H04L 67/34* (2013.01)

(58) Field of Classification Search
None
See application file for complete search history.

(56) References Cited

U.S. PATENT DOCUMENTS 5,497,334 A 3/1996 Russell et al.
5,517,645 A 5/1996 Stutz et al.
(Continued)

OTHER PUBLICATIONS

*Decision Model and Notation*. Object Management Group, 2015. 182 pages.

(Continued)

*Primary Examiner* — Shih-Wei Kraft
(74) *Attorney, Agent, or Firm* — Mintz Levin Cohn Ferris Glovsky and Popeo, P.C.

(57) ABSTRACT

A cloud-based decision management platform along with corresponding method, system, and a computer program product are disclosed. At least one component of at least one computing system is selected from a plurality of components of the computing system. The selected component is configured for execution during a runtime of the computing system. The configured component is executed during runtime. The components of the computing system are stored in a catalog module based on at least one characteristic that includes at least one of the following: analytics, decisioning, identity and access management, and optimization.

12 Claims, 11 Drawing Sheets

Related U.S. Application Data

(60) Provisional application No. 61/928,951, filed on Jan. 17, 2014.

(51) Int. Cl.
   *G06F 8/34* (2018.01)
   *H04L 29/08* (2006.01)
   *G06F 8/35* (2018.01)

(56) References Cited

U.S. PATENT DOCUMENTS

| | | |
|---|---|---|
| 6,615,199 B1 | 9/2003 | Bowman-Amuah |
| 6,931,599 B1 | 8/2005 | Korenshtein |
| 7,272,820 B2 | 9/2007 | Klianev |
| 7,665,064 B2 | 2/2010 | Able et al. |
| 8,386,525 B2 | 2/2013 | Pace et al. |
| 8,417,938 B1 * | 4/2013 | Considine ............ G06F 9/5088 713/151 |
| 9,690,575 B2 | 6/2017 | Prismon et al. |
| 2002/0104068 A1 | 8/2002 | Barrett et al. |
| 2005/0085937 A1 | 4/2005 | Goodwin et al. |
| 2005/0278348 A1 | 12/2005 | Falter et al. |
| 2007/0220022 A1 | 9/2007 | Lankinen et al. |
| 2008/0172673 A1 | 7/2008 | Naik |
| 2008/0209392 A1 | 8/2008 | Able et al. |
| 2010/0306772 A1 | 12/2010 | Arnold et al. |
| 2010/0333083 A1 | 12/2010 | Chancey et al. |
| 2012/0185821 A1 | 7/2012 | Yaseen et al. |
| 2013/0006707 A1 * | 1/2013 | Ssubhanjan ............ G06Q 30/02 705/7.29 |
| 2013/0239089 A1 | 9/2013 | Eksten et al. |
| 2014/0052773 A1 * | 2/2014 | Deng ..................... H04L 67/42 709/203 |
| 2014/0075032 A1 * | 3/2014 | Vasudevan ............. H04L 41/50 709/226 |
| 2014/0075033 A1 * | 3/2014 | Doering ............. H04L 41/5054 709/226 |
| 2014/0244799 A1 * | 8/2014 | Kundgol ................. H04L 67/32 709/219 |
| 2014/0278807 A1 | 9/2014 | Bohacek |
| 2015/0067171 A1 * | 3/2015 | Yum .................... G06F 9/5072 709/226 |
| 2015/0156280 A1 | 6/2015 | Vaswani et al. |
| 2015/0205602 A1 | 7/2015 | Prismon et al. |

OTHER PUBLICATIONS

Jayasinghe, Deepal, et. al. "Improving Performance and Availability of Services Hosted on IaaS Clouds with Structural Constraint-Aware Virtual Machine Placement." *2011 International Conference on Services Computing*, IEEE. pp. 72-79.

Li, Jim, et. al. "Fast Scalable Optimization to Configure Service Systems Having Cost and Quality of Service." *Proceedings of the 6th International Conference on Automatic Computing*, Jun. 15-19, 2009, Barcelona Spain, pp. 159-168.

International Search Report and Written Opinion from PCT/US2015/010594.

Hatcliff, John, et al., "Cadena: An Integrated Development, Analysis, and Verification Environment for Component-based Systems", ICSE '03, Portland, OR, May 3-10, 2003, 13 pages.

Lau, Kung-Kiu, et al., "Software Component Models", IEEE Transactions on Software Engineering, vol. 33, No. 10, Oct. 2007, pp. 709-724.

\* cited by examiner

CLOUD-BASED DECISION MANAGEMENT PLATFORM

CROSS-REFERENCE TO RELATED APPLICATION

The present application is a continuation of and claims priority to U.S. patent application Ser. No. 14/592,353 to Prismon et al., filed Jan. 8, 2015, now U.S. Pat. No. 9,690,575, and entitled "Cloud-Based Decision Management Platform", which claims priority to U.S. Provisional Patent Application No. 61/928,951 to Prismon et al, filed Jan. 17, 2014, and entitled "Cloud-Based Decision Management Platform," and incorporates their disclosures herein by reference in their entireties.

TECHNICAL FIELD

The subject matter described herein relates to a cloud-based platform for providing analytic decision services.

BACKGROUND

The development of analytic decision applications is conventionally time and resource intensive. Decision service applications typically are developed by analytic scientists in a language familiar and optimized for mathematical modeling. Thereafter, the applications are then rewritten in an enterprise language such as JAVA to integrate with outside security systems, monitoring, reporting and data access. In addition, the application must also be configured for deployment, integrated with a pre-existing IT infrastructure. Prior to full deployment and running of an application, captured operational and business/knowledge metrics (that allow for improvement of the analytic services) have to be manually propagated back to the analytic scientists that originally developed the technology.

SUMMARY

In some implementations, the current subject matter relates to a computer implemented method. The method can include selecting at least one component of at least one computing system from a plurality of components of the computing system, configuring the selected component for execution during a runtime of the computing system, and executing the configured component during runtime. The plurality of components of the computing system can be stored in a catalog module based on at least one characteristic. The characteristic can include at least one of the following: analytics, decisioning, identity and access management, and optimization. At least one of the selecting, the configuring, and the executing can be performed by at least one processor of the at least one computing system.

In some implementations, the current subject matter can include one or more of the following optional features. In some implementations, the plurality of components of the computing system can be stored in a catalog module based on at least one characteristic. The characteristic can include at least one of the following: analytics, decisioning, identity and access management, and optimization.

In some implementations, a computing solution can include at least one component. The computing solution can be also configured. Further, the computing solution and the component can be configured separately.

In some implementations, the computing system can include at least one of the following: a catalog computing environment, a library computing environment, and the runtime computing environment. The computing component can be selected in the catalog computing environment, configured in the library computing environment, and executed in the runtime computing environment. Further, a first user interface can be associated with the catalog computing environment for selecting the component. A second user interface can be associated with the library computing environment for configuring the selected component. A third user interface can be associated with the runtime computing environment for managing and monitoring execution of the configured component.

In some implementations, the component can include at least one dependency on at least another component in the plurality of components of the computing system. The component can be executed in accordance with the dependency on another component.

In some implementations, the method can include providing lifecycle management for the component by maintaining at least one artifact associated with the component.

In some implementations, the current subject matter relates to a computer implemented method. The method can include creating, using a solution building computing module, at least one computing component and at least one computing solution of at least one computing system, wherein the at least one computing solution includes at least one computing component. The method can further include storing the created at least one computing component and the at least one computing solution in a catalog module, the catalog module containing a plurality of computing components and a plurality of computing solutions of at least one computing system, the catalog module storing the plurality of computing component and the plurality of computing solutions based on at least one of the following characteristic: analytics, decisioning, identity and access management, and optimization, wherein the catalog module is stored in at least one of the following: a cloud storage and an on-premise storage associated with the at least one computing system. The method can also include selecting, using the catalog module, at least one of the following: the at least one computing component and the at least one computing solution, for configuration and execution in the at least one computing system. The method can further perform configuring of at least one of the selected computing component and the at least one computing solution based on at least one requirement of the at least one computing system and at least one dependency on at least one of the following: at least another computing component in the plurality of computing component and at least another computing solution in the plurality of computing solutions. The method can also perform executing the at least one of the configured computing component and the configured computing solution during runtime and persisting data generated by the executed computing component and the executed computing solution. At least one of the creating, the storing, the selecting, the configuring, and the executing can be performed upon receiving authentication from the at least one computing system.

Non-transitory computer program products (i.e., physically embodied computer program products) are also described that store instructions, which when executed on one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
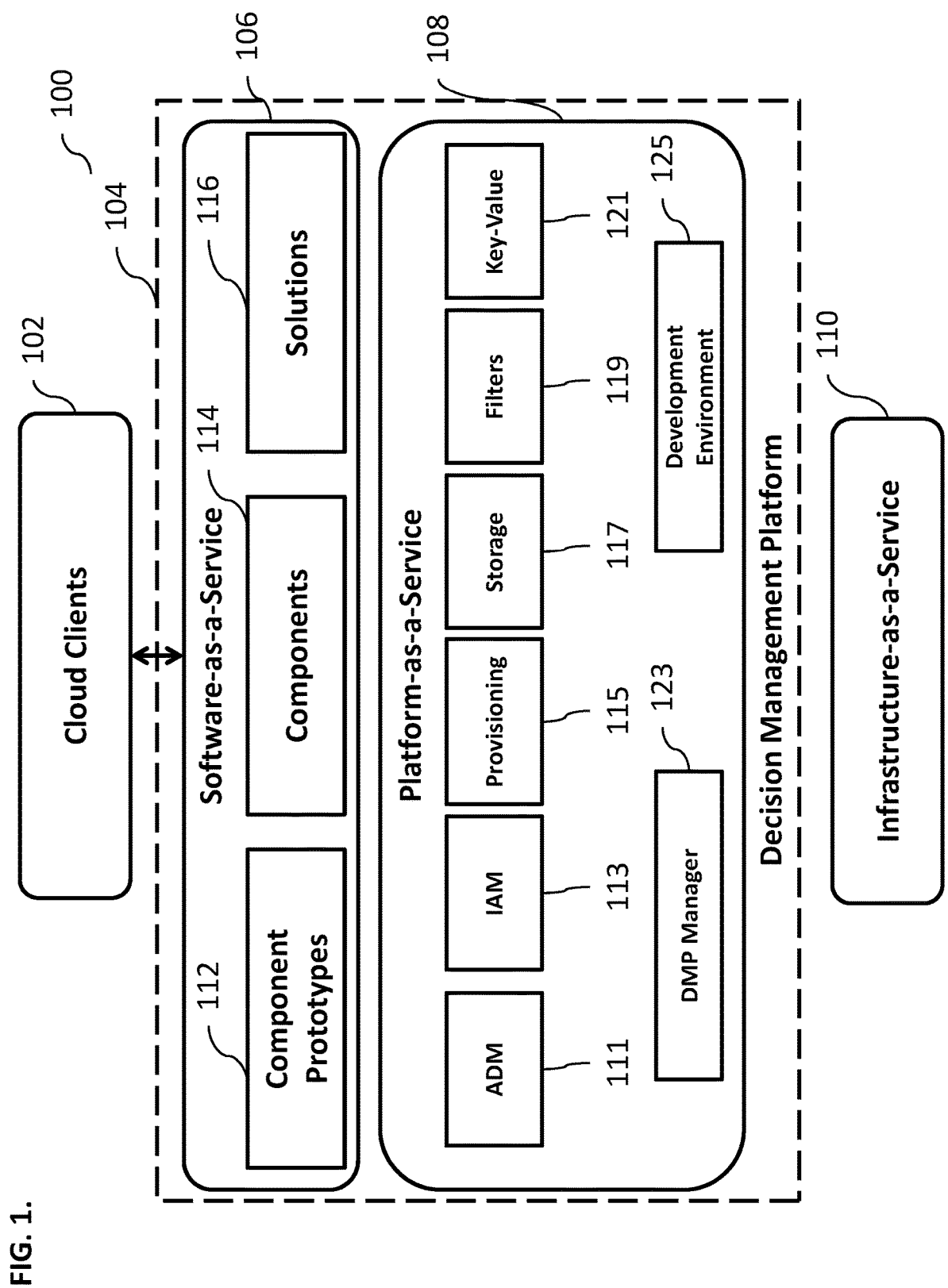
FIG. 1 illustrates an exemplary architecture that can incorporate a decision management platform, according to some implementations of the current subject matter.

In some implementations, the current subject matter provides a cloud-based or on-premise platform that can enable various decisioning technologies to be used via a single interface. In particular, the platform can provide an application user interface, application orchestration, data management, post-deployment application performance monitoring and/or management, via a unified interface and/or single source.

In some implementations, the current subject matter described herein can provide many advantages. For example, the current subject matter can allow for cost-effective development, configuration, deployment, improvement and scaled cloud-based and on-premise analytic solutions for real-time and batch decision management at a fraction of the price of previous bespoke or product-centric development. In addition, the current subject matter can leverage and extend pre-existing decision management tools for embedding business rules, analytics, optimization and adaptive control to automate and improve strategies. Still further, the current subject matter can allow for easy consumption of decision services by provided an integrated knowledge editor and a managed lifecycle that allow cloud-based decision services to be deployed with a single click. Further, the current subject matter can enable technologies to be developed in whatever language or technology is most familiar to the contributor, while still allowing for enterprise features to be injected into the decision service. This arrangement can also allow for the latest innovations in open source, proprietary and cloud-based technologies to be available, thereby allowing for a decision services to transparently evolve and improve.

In some implementations, the current subject matter can provide a cloud-based computing platform (sometimes referred to as "Decision Cloud Platform", "DCP", "Decision Management Platform", "DMP" and/or simply as the "platform"). The decision management platform is a Platform-as-a-Service that can be deployable in a public and/or private cloud setting. It can allow for independent heterogeneous decisioning and predictive analytics technologies, acquired via a catalog/marketplace and orchestrated via a visual tool, to form analytically powered and intelligent applications and solutions. The decisioning and predictive analytics technologies provided by the platform can be packaged as independent, self-describing, pluggable modules that are managed in a lifecycle, and instrumented transparently to provide operational and business functionality without any modification to the core decisioning technology.

In addition to decision modules provided by Fair Isaac Corporation (FICO), San Jose, Calif., USA, decision modules by third parties can be added to the platform. The platform can transparently wrap each decision module with needed rules, filters, models (analytic and otherwise) and processes to allow each decision module to be orchestrated into analytically powered applications and solutions. Example decision modules can include a wide variety of predictive models, optimization algorithms, business and operational rules, decision trees, decisions tables, scorecards, decision graphs. In addition these decision modules can be configured via multiple industry standards such as PMML, XML, JSON, etc.

Decision modules can be included in a lifecycle that incorporates adaptive learning. Modules can be deployed, configured, upgraded and downgraded based on key performance indicators ("KPIs") calculated and gleaned from execution. Once configured, the decision module is deployed and continues to collect data and test alternatives to allow for further evolution of the decision module.

During deployment, an automated process can apply data to the decision module and compare it to expected values to automatically validate and audit the integrity of the module.

The platform can include an adaptive predictive model that can allow the system to optimize each decision module resource allocation across a variety of user defined KPI's including business value, responsiveness, latency, central processing unit ("CPU") and memory utilization. One of the objectives of the decision management platform can include providing an infrastructure that makes it dramatically easier and/or faster for users, professional services ("PS"), and application development teams to create end-to-end, decisioning-focused applications that can leverage various technologies. End-to-end, in this regard, refers to meeting the entire continuum of an application's requirements.

The decision management platform can provide a set of functionality to each decision service and transparently inject these services into standalone pre-existing decision services with no modification needed to the original code or concept. The decision management platform does not require any code or process changes to make a stand alone pre-existing decision service a full citizen of the decision management platform.

The functionalities discussed below can be provided as part of the decision management platform and/or be transparently injected into each component. All of the improvement and/or operations provided by the platform can be automatically enrolled in an automated decision management system. This system can leverage various technologies to automatically design and implement test and learn methodologies, including random selection and population segregation. The system can also support automatic generation of KPIs for both reporting and for automatic selection based on champion/challenger methodologies. Experiments can be setup in a consistent way across rules, models, optimization models and other decision services. Experiments can be automatically evaluated with a champion or challenger selected after an evaluation period. Finally, new experiments can be setup without any modification to the decision service.

The decision management platform can provide a managed lifecycle where analytic services and templates can be harvested from the context in which they originated and made available for use in other contexts. This process can include not only the wrapping of a decision service or template to operationalize it, but also deploying the decision service to individual nodes, protected by a software lifecycle.

The decision management platform can provide a lifecycle that allows for auditing and approval at all stages of the software-lifecycle. This process can be independent of the decision service and universally applied, improving the value proposition of the decision service, and the customer's time-to-value for the services.

The decision management platform can provide infrastructure for managing and monitoring the lifecycle of decision cloud components and/or services. Such components can:

1. represent reusable, configurable, deployable units of functionality;
2. conform to a standard component model;
3. be self-describing and configurable as an individual entity;
4. be versioned so that changes are automatically cataloged, audited and propagated out;
5. be entities, such as score models, optimization models, and various business rule-based entities, all of which can be used to automate/improve business decisions;
6. be non-decisioning components such as short message service ("SMS"), Data Access and/or email delivery mechanisms.
7. be isolated to protect both their internal data and state from other components and/or services and to ensure individual scalability and failure protection;
8. be screened, where any data flowing in and out of the decision management platform can be scanned for viruses, inappropriate data (such as protected HIPAA, PCI or pII data) and/or weaponized data;
9. be cataloged for use in an individualized catalog/marketplace; and,
10. be aggregated into solutions that are business processes that orchestrate the execution sequence of one or more components, thereby satisfying a well-defined business need.

Components can be individually wrapped in series of universal services. These services can add considerable value to each individual decision service. They can be technically implemented as a series of proxies or filters that intercept all data flowing to or from a decision service.

The decision management platform can provide one or more of the following services transparently:
authentication:
    systems and/or users that access each service and/or solution can have a verified identity;
authorization:
    systems and/or users that access each service and/or solution can be granted access to the component, or be denied access otherwise.
channels:
    a mechanism for adding new channels such as REST, SOAP and/or highspeed delivery channels for components can be provided.
auditing:
    calls into each service can be logged for legal compliance reasons
Test & Learn
    Calls into each service can be captured and routed based on experimental design.
KPI generation
    Automatic KPI's can be generated for each call depending on user-configurable criteria
Scalability Monitoring
    If too much or not enough capacity is needed for a particular component, the system can be able to auto-scale adding or removing capacity.

The decision management platform can allow for solutions made up of individual components, plus an orchestration. An orchestration can be a code or visual design that specifies how data should flow from component to component. Solutions can also "own" data. They can be responsible for the management of data sources that components use to make decision. Solutions can have an individual authentication and authorization associated with then. Components in a solution can be transparently accessed using the same security credentials. Components inside of a solution can have their individual audit results and KPI's propagated and displayed in a single place for a cohesive analytical view of a solution.

FIG. 1 illustrates an exemplary architecture 100 that can incorporate a decision management platform, according to some implementations of the current subject matter. The architecture 100 can include at least one cloud client 102, a software-as-a-service ("SaaS") component 106 and platform-as-a-service component ("PaaS") 108 incorporated into a decision management platform 104, and infrastructure-as-a-service component ("IaaS") 110. Each component can be a software application, a hardware component, and/or a combination of a hardware and/or software. The architecture 100 can be incorporated and/or can be part of a cloud computing model. A cloud computing model can involve a computer network which can include, a plurality of servers communicatively coupled through a network (e.g., Internet, an intranet, a local area network ("LAN"), a wide area network ("WAN")). A user can use servers to run an application, store data, and/or perform any other computing task. Thus, the user can run an application from anywhere in the world, as the servers provide processing power to the application and servers are also connected to a network via the Internet and/or other connection platforms to be accessed from anywhere.

The cloud client 102 can include a web browser application, a mobile application, a thin client, a terminal emulator, and/or any other application, software, and/or hardware/software component that can communicate with the decision management platform 104.

The software-as-a-service 106 can be a software licensing and delivery model in which software can be licensed based on a subscription and centrally hosted in the cloud by independent software vendors or application service providers. SaaS can be accessed by users using a thin client via a web browser. SaaS can be a delivery model for business applications, which can include office and messaging software, database management software, customer relationship management ("CRM"), management information systems ("MIS"), enterprise resource planning ("ERP"), invoicing, human resource management ("HRM"), content management ("CM"), service desk management, etc. The SaaS 106 can further include a plurality of modules that can be responsible for decisioning, analytics and modeling of various components.

The platform-as-a-service 108 can include cloud computing services that provide a computing platform and a solution stack as a service. Using PaaS 108, a user can create an application and/or service using tools and/or libraries from a provider. The user can control software deployment and configuration settings. The provider can provide networks, servers, storage, and/or other services that can be required to host the user's application. The PaaS 108 can include application design, application development, testing, deployment, services such as team collaboration, web service integration, and marshalling, database integration, security, scalability, storage, persistence, state management, application versioning, application instrumentation, and developer community facilitation. The PaaS 108 can also provide service management, such as monitoring, workflow management, discovery, reservation, etc. In some implementations, the PaaS 108 can contain a plurality of module, which can include an analytic datamart module 111, an identity and access management module 113, a provisioning module 115, at least one storage module 117 (e.g., a relational storage, a big data storage, etc.), at least one filter 119, and a key-value module 121. The provisioning module 115 can allow outside service (e.g., third party services) to be provisioned. The services can be provisioned automatically on an as-needed basis.

The filters 119 can include a translation filter, a security filter, an authorization filter, a circuit breaker, scalability filter, and/or any other desired filters. The translation filter can provide localized language resources for various components of the system (e.g., translation from one language to another at design time, runtime, etc.). The security filter can ensure that only authorized applications and/or users can access the decision management platform components. The authorization filter can ensure that users are authorized to access protected endpoints of the decision management platform and/or its various components and/or data. The circuit-breaker filter can ensure that components are not overwhelmed by traffic (either incoming and/or outgoing from user and/or applications). The scalability-filter can automatically invoke scale up (which can create more instances) of a component to meet dynamic traffic requirements.

Additionally, the PaaS 108 can include a decision management platform manager 123 (described in more detail with regard to FIG. 2 below) and a development environment 125 (also described in more detail with regard to FIG. 2 below). The decision management platform manager 123 can provide various standard services that can control lifecycle and deployment of components and/or solutions. In some implementations, deployment can be automated. The standard services can include a key-value pair system that can allow storage of data as well as access to the data at low latencies. In some implementations, the provisioning module 115 can also be part of the standard services. The development environment 125 can provide various standard tools that can be used to rapidly assemble prebuilt analytic and/or operational constructs into a business application.

The infrastructure-as-a-service 110 can provide physical machines and/or computers. In particular, the IaaS 110 can provide a virtual-machine disk image library, a raw block storage, a file and/or object storage, a firewall, a load balancer, an IP address, a virtual local area network ("VLAN"), software bundles, etc. The hardware resources can be provided on-demand from providers' data centers. Various dedicated virtual private networks, and/or any other networks can be used for delivery of the services. In some implementations, the IaaS 110 can include analytic cloud capabilities, such as those provided by FICO Analytic Cloud, as available from Fair Isaac Corporation (FICO), San Jose, Calif., USA.

In some implementation, the SaaS 106 can include the following software components: component prototypes 112, components 114, and solutions 116. The component prototypes 112 can be decision management platform's software elements that can define, constrain, and/or serve as foundations for configurable and/or deployable DMP elements.

The components 114 can be decision management platform software elements that can conform to the decision management platform component model definition and/or represent a configurable/deployable unit of functionality. The behavior exhibited by the component 114 can be defined and/or constrained both by its underlying prototype definition and its configuration, if any. In some implementations, a component can be a decision management platform functionality that can be packaged and/or accessed in accordance with the decision management platform component specification. The component specification can include a set of requirements describing packaging and access points for a decision management component. Conforming components can be used by multiple customers, in multiple solutions. Scoring models, optimization models, and business rules projects can all be packaged and deployed as components.

In some implementations, the components 114 can include CM variable library, underwriting knockout rules, application fraud model, channel optimization model, and offer optimization model, as well as other components. The CM variable library can encapsulate business rules and/or logic in a standard library, which can be used by the (some or all) decision management platform components and/or solutions. The knockout rules can include systematic rules that can process various rules sequentially, process records until records match a specific condition, and/or can be "knocked out" (e.g., removed) of the rule with an appropriate action and/or treatment. The application fraud model(s) can include models that can determine patterns of behavior and automatically flag divergent behavior for purposes of fraud detection. The channel optimization model(s) can include models that can predict the most effective use of sales channels to maximize return on investment of using a particular channel. The offer optimization model(s) can include models that can optimize a relative value and/or cost of making a consumer an offer for a particular product against other offers for other products.

The solutions 116 can be decision management platform software elements that can represent collections of DMP components whose execution sequence can support various business functionalities and can be defined within the context of the solution. In some implementations, solutions can be business processes that orchestrate multiple components into a product offering that meets a specific business need.

The component prototypes 116 can include a decision model, an optimization model, a predictive markup model language ("PMML") model, a SAS model, variable library, and/or any other component prototypes. The PMML model can include a model that can be specified in the PMML markup language. Model types can include, but are not limited to, a logistic regression, a neural network, and/or scorecard models, and/or any other modes. These models can be used for data mining and/or other machine learning applications. The SAS model can include a model that can be specified by, and can typically be exported by SAS, an analytic and/or machine learning tool. The variable library can include a standard set of variables that have been packaged for re-use. Other component prototypes can include modules that can support R based analytics, scripting languages (such as Python language, as developed by Python Software Foundation, Delaware, USA, and/or Ruby language) and/or other analytics packages.

Figure 2:
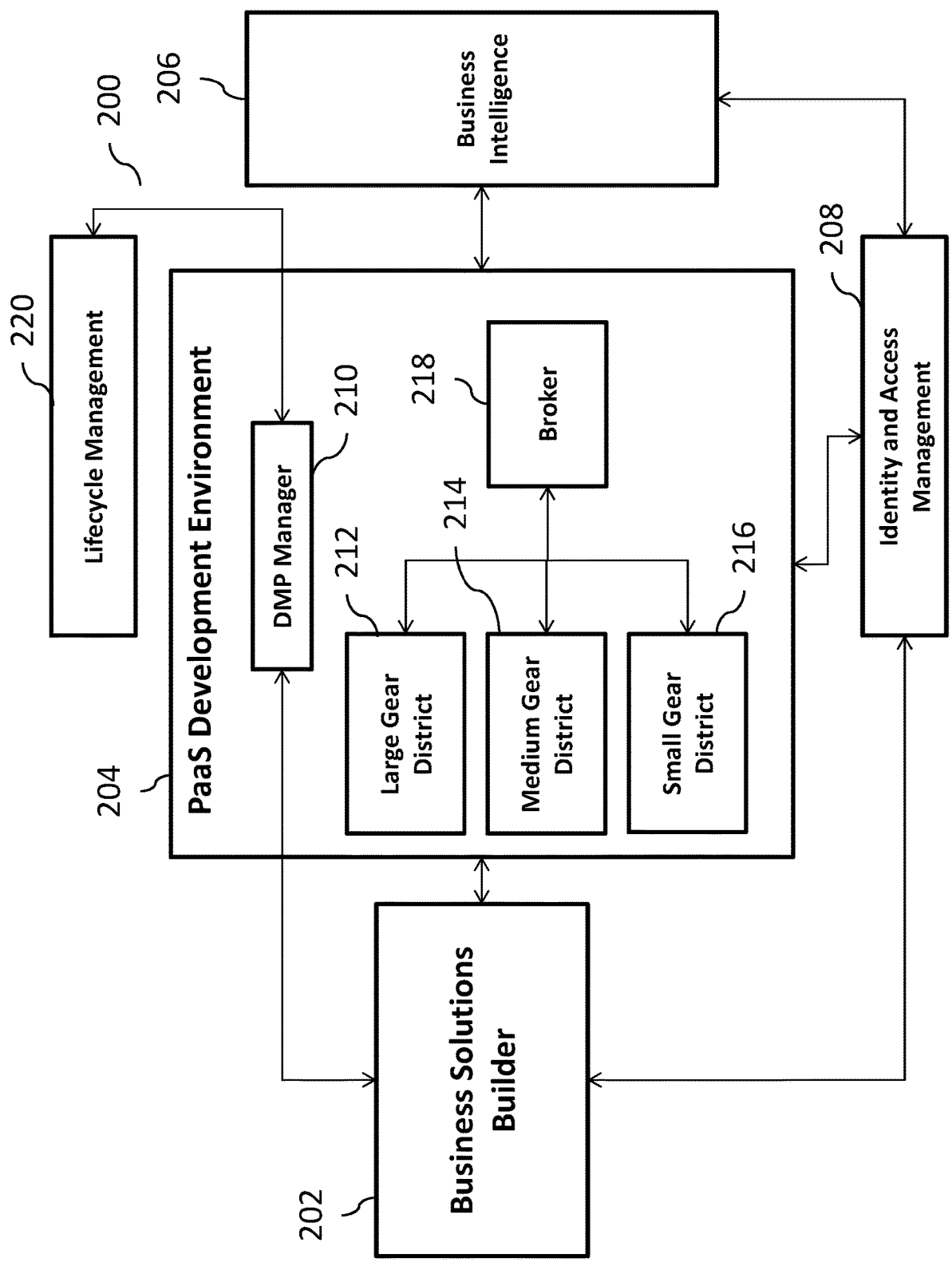
FIG. 2 illustrates an exemplary physical implementation system of a decision management platform, according to some implementations of the current subject matter.

FIG. 2 illustrates an exemplary physical implementation system 200 of a decision management platform, according to some implementations of the current subject matter. The implementation 200 can include a business solutions builder module 202, a PaaS development environment 204, a business intelligence module 206, an identity and access management module 208, and a lifecycle management module 220. The system 200 can be implemented on one or more virtual machines, physical machines, and/or a combination of both. The system 200 can allow application developers and/or users to perform various application tasks, manage application activities, monitor execution of components, etc.

Figure 3:
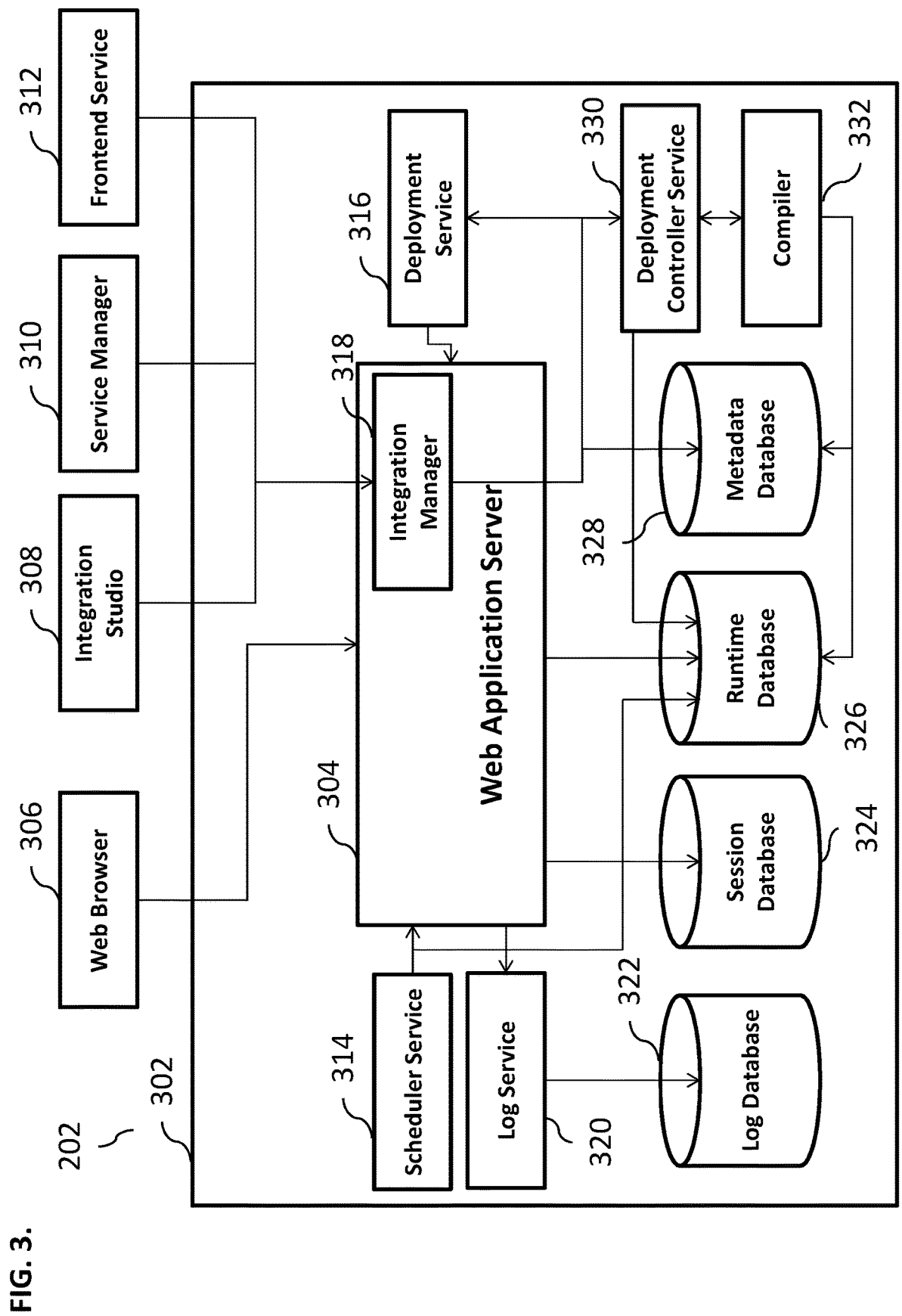
FIG. 3 illustrates an exemplary business solutions builder, according to some implementations of the current subject matter.

The business solutions builder 202 is illustrated in more detail in FIG. 3, according to some implementations of the current subject matter. The solutions builder 202 can include a server 302. The server 302 can include an application server 304, which can be a web application server and can include one or more applications and/or web applications (not shown in FIG. 3) and a integration manager 318 (e.g., a web service center application). The server 302 can further include a scheduler service 314, a log service 320, a deployment service 316, a deployment controller service 330, a compiler 332, and various databases, such as a log database 322, a session database 324, a runtime database 326, and a metadata database 328. The application server 304 can communicate with a web browser 306, an integration studio module 308, a service manager 310, and a frontend service module 312.

In some implementations, the business solutions builder 202 can be a primary mechanism though which the decision management platform components can be used to build business solutions. As shown in FIG. 3, the web browser 306 can be used by a user of the decision management platform (and/or an application developer) to access the decision management platform. The integration studio 308 can be an environment (e.g., a desktop environment that can be used by a developer) that can be used to integrate external libraries, services, databases, etc. The service manager 310 can be an environment (e.g. a desktop environment that can be used by a developer) that can be used to assemble and/or change web and/or mobile web business applications using visual models. The frontend service 312 can be an application (e.g., a web application) that can be used by system administrators, managers and operation teams to control various aspects of the business solutions builder 202. The deployment service module 316, the deployment controller service module 330, and the compiler module 332 can be responsible for compiling applications' models and deploying the compilation result in the front-end servers.

The business solutions builder 202 can also include various persistence services. These services can be used to leverage a relational database management systems ("RDBMS") for the purposes of persisting various information, e.g., metadata, logs, scheduling, etc. The metadata database 328 can be used to store information about applications' versions, platform users, security configuration policies, etc. The log service 320 along with the log database 322 can be used to store processed logs that can be generated by the execution of applications supported by business solutions builder 202. The scheduler service module 314 along with the session database 324 can be used to manage execution of scheduled jobs resulting from the compilation of timer objects and business processes' activities modeled inside service manger 310. In some implementations business solutions builder 202 can include a component that can provide graphical orchestration for the purposes of tying together individual components, with conditional branching, error handling, integrated security, etc.

In some implementations, the business solutions builder's based applications can invoke various deployed decision management platform services via either the services REST or SOAP-based endpoints.

Referring back to FIG. 2, the PaaS development environment component 204 can include a plurality of districts 212-216, a decision management platform manager 210, and a broker 218. Each district can include a plurality of gears or components. A gear or a component can be a resource-constrained container where one or more cartridges can be run and which can limit an amount of RAM and/or disk space available to a cartridge. A cartridge can provide an actual functionality necessary to run an application (e.g., cartridges can support programming languages such as Perl, PHP, Ruby, etc. as well as database cartridges, such as PostgreSQL, MySQL, etc.). In some exemplary implementations, cartridges can include web servers, application servers, and databases.

In some implementations, components can declare dependencies on the cartridges they need to run and the decision management platform can manage instances that are used by the component(s). Component dependencies can include a list of cartridges, other resources, and/or input data required by a component. The list can be available in a component descriptor. In some implementations, component descriptor can be component.json file (in Java Script Object Notation ("JSON") format) that can contain information describing a decision management platform component. The descriptor can be accessed through a web endpoint for the component, and can contain identification details, lists of dependencies, lists of contributions, and/or descriptions of input and/or output messages.

In some implementations, multiple gears can run on a single physical and/or virtual machine. Such machine can be a node host and can enable resource sharing. Gears can be organized into districts. Districts can include similarly-configured nodes and can allow horizontal scaling, i.e., when physical resources on a given node are exhausted by the gears it is hosting, additional nodes can be dynamically added to the district to handle processing loads.

In some implementations, the decision management platform components that can be involved in data/content creation and/or consumption can include the decision management platform manager 210, application-specific gears included in the districts 212-216, an analytic datamart ("ADM") manager that can be included in the decision management platform, the business solutions builder 202, and business intelligence components 206.

The decision management platform manager 210 can be responsible for managing metadata related to components and solutions. Such management can include programmatically interacting with lifecycle management 220's repository to manage component-related artifacts as they are processed through the decision management platform lifecycle management process.

The application-specific gears (included in the districts 212-216) can consume and/or return various data when invoked by a calling solution and can generate various events whose payloads can be persisted in the ADM manager (e.g., for reporting purposes).

The ADM can be an event-based infrastructure for capturing and persisting data generated by deployed components. The ADM manager can be a decision management platform process (or a gear included in the districts 212-216) that can monitor for component-generated events and can persist payloads of the events to the ADM (e.g., for reporting purposes).

The business solutions builder 202 can be responsible for retrieving input data from appropriate data source(s), passing the data to invoked components, and processing data returned from the invoked components.

The business intelligence component 206 can transform data into a format that can be consumed by business intelligence based reports and/or dashboards.

In some implementations, the broker 218 can be a single point of contact for all application management activities. It can be responsible for managing user logins, DNS, application state, general orchestration of an application, etc.

In some implementations, the decision management platform can accommodate various district sizes. FIG. 2 illustrates three exemplary sizes of the districts: a large gear district 212, a medium gear district 214, and a small gear district 216. Other size districts can be created to accommodate various organization and/or processing requirements. Each gear district 212-215 can supply differing amounts of physical computing resources to the nodes and gears hosted in a given district. In some implementations, a number of districts and/or their configuration can be based upon system requirements, processing capabilities, user desires, etc.

In some implementations, the DMP manager 210 can provide a core decision management platform behavior. It can provide various application programming interfaces (e.g., REST APIs) that can support decision management platform web user interface and/or lifecycle management ("LCM") capabilities, as discussed below. In some implementations, the lifecycle management element 220 can provide application lifecycle management, e.g., check-in, checkout, promote from development-to-production, etc.

The identity and access management module 208 can provide various security features to the decision management platform. The module 208 is discussed in further detail below.

The business intelligence module 206 can provide out-of-the-box ("OOTB") business intelligence ("BI") capabilities for the decision management platform. The module 206 can provide for generating a multidimensional schema from various data sources, connectors to multiple third party enterprise application infrastructures, an extract, transform, load ("ETL") engine for a datamart population, and a web based user interface(s) for creation and/or display of reports and/or dashboards. In some implementations, the business intelligence module 206 can include a business intelligence appliance, e.g., a server, and at least one database. The databases in the business intelligence module 206 can include a database for use during solution development and testing, and/or a database against which production various reports can be generated.

Figure 4:
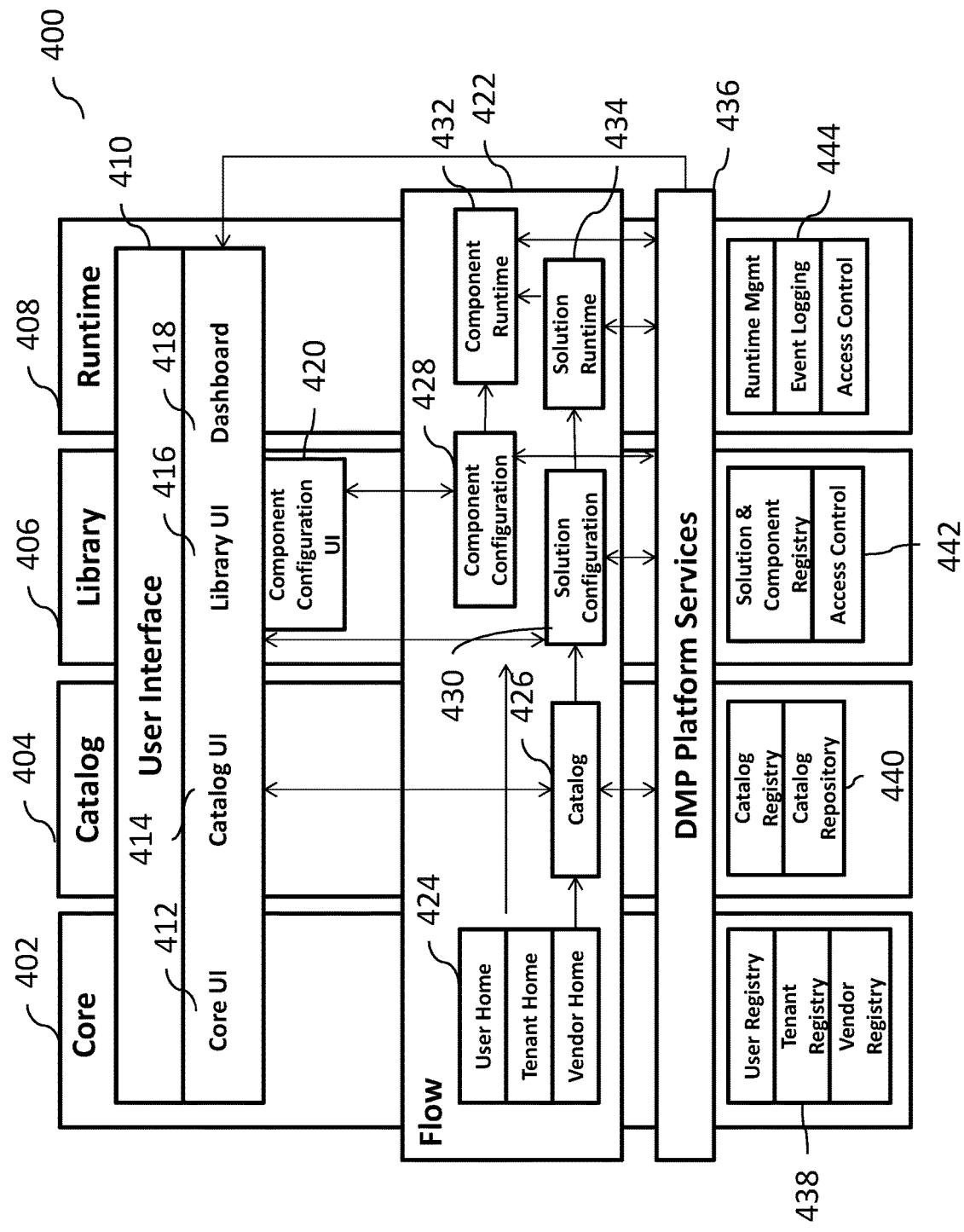
FIG. 4 illustrates an exemplary functional view of the decision management platform system, according to some implementations of the current subject matter.

FIG. 4 illustrates an exemplary functional view 400 of the decision management platform system, according to some implementations of the current subject matter. The decision management platform can include platform core and services environment 402, a catalog environment 404, a library environment 406, and a runtime environment 408. The platform core and services environment 402 can provide for user account management, tenant management, vendor management, dashboards, management and monitoring of runtimes, as well as any other services. The catalog environment 404 can provide off-the-shelf component and solution repository, registering and deregistering catalog items, provisioning of catalog items to the library environment 406.

Figure 9:
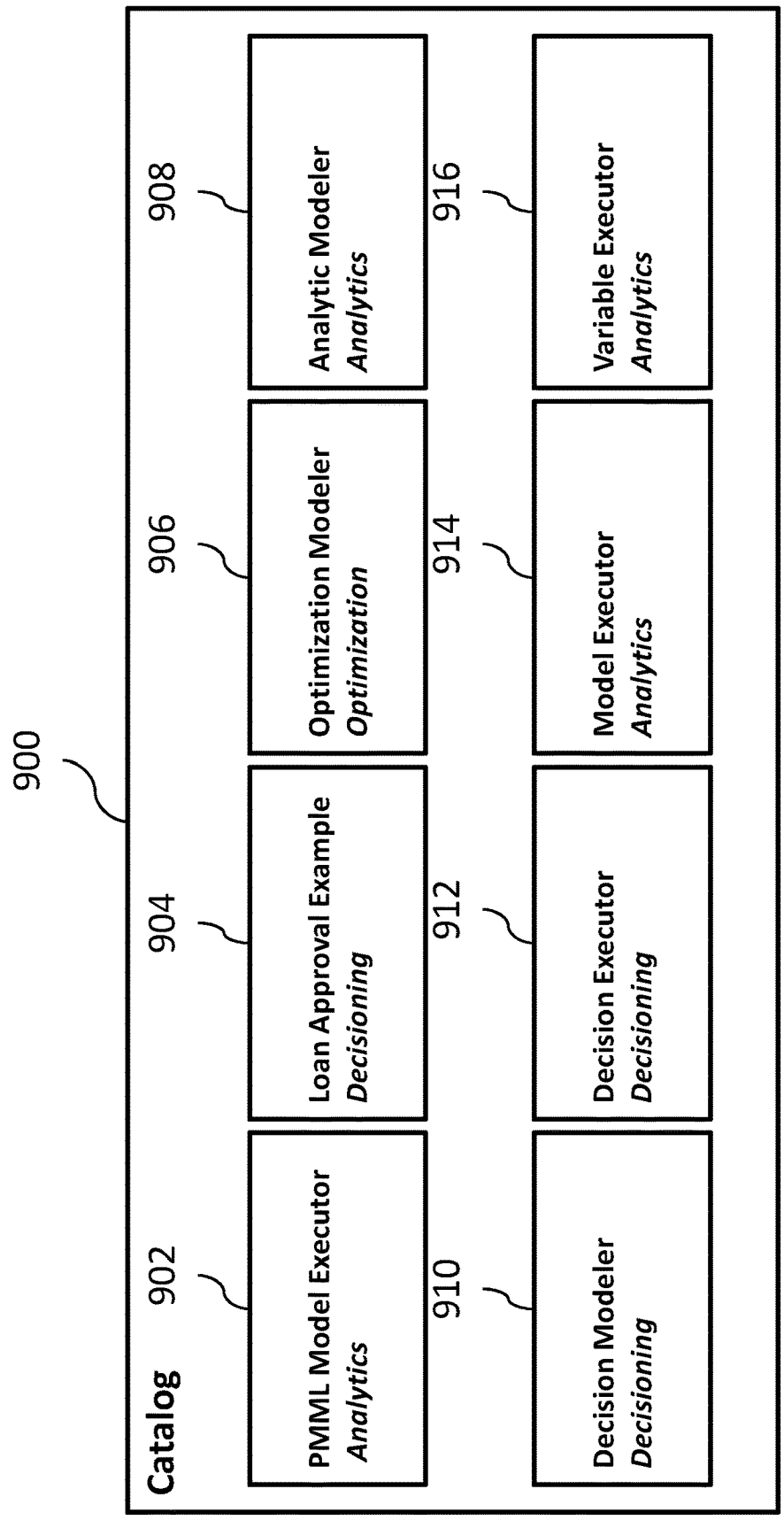
FIG. 9 illustrates an exemplary catalog user interface, according to some implementations of the current subject matter.

An exemplary catalog user interface 900 is illustrated in FIG. 9, according to some implementations of the current subject matter. The catalog 900 can be organized according to various categories of components that can be used searched for and/or selected by the user. Some of these categories (shown in italics in FIG. 9) can include analytics, decisioning, optimization, etc. Each category of components can include one or more components. For example, the analytics category can include a PMML model executor 902, an analytic modeler 908, a model executor 914, and a variable executor 916. The decisioning category can include a loan approval example 904, a decision modeler 910, a decision executor 912. The optimization category can include an optimization modeler 906. In some implementations, the executors 902, 912, 914, 916 can use models (discussed above) and apply these models to data to generate scores that can be used for the purposes of prediction of various items, such as, for example, a bankruptcy risk, an ideal marketing spend, an ideal channel selection, an ideal offer selection, etc. The loan approval example 904 can be used to guide users through the process of creating a loan approval service for their own services.

Further, the decision modeler 910 and the decision executor 912 can be used to provide business rules management. It can be further used to build complete decision systems, including knockout rules, decision flows, scorecard based systems, decision table based applications, etc. In some implementations, management of business rules can allow users (e.g., business managers of a company, etc.) to create, maintain and/or control business applications quickly, easily and cost effectively to generate faster and consistent decisions. Users can control business policies and procedures throughout their operational systems, without programming and/or specialized development packages. Users can also define complex decisions to support interactive and/or batch applications. Business rules can be based on corporate policies and guidelines, external regulations and/or analysis of various data. Once rules are in place, they can be applied to multiple systems and communication channels so the business can interact with customers in a consistent manner according to best practices.

The analytic modeler 908 can be used to quickly analyze raw data and generate a standard set of variables and/or models that can be used to predict arbitrary outcomes. The analytic modeler 908 can provide a complete model development process, which can allow users to access, explore and analyze data, calculate variables, document key modeling steps, and build, evaluate and deploy models. The modeler 908 can provide accelerated modeling, while allowing users to control and/or refine models to suit their business decision-making needs. The analytic modeler 908 can interact with the decision modeler 910 to adapt predictive models and business rules to fast-changing conditions.

The library environment 406 can also be referred to as a configuration/design-time container. The environment 406 can provide solution structure, configuration and/or resources, component configuration and/or resources, etc. The runtime environment 408 can provide deployment and execution of configured solutions and components, monitoring of solutions and/or collection of key performance indicators ("KPI"), etc.

Figure 5:
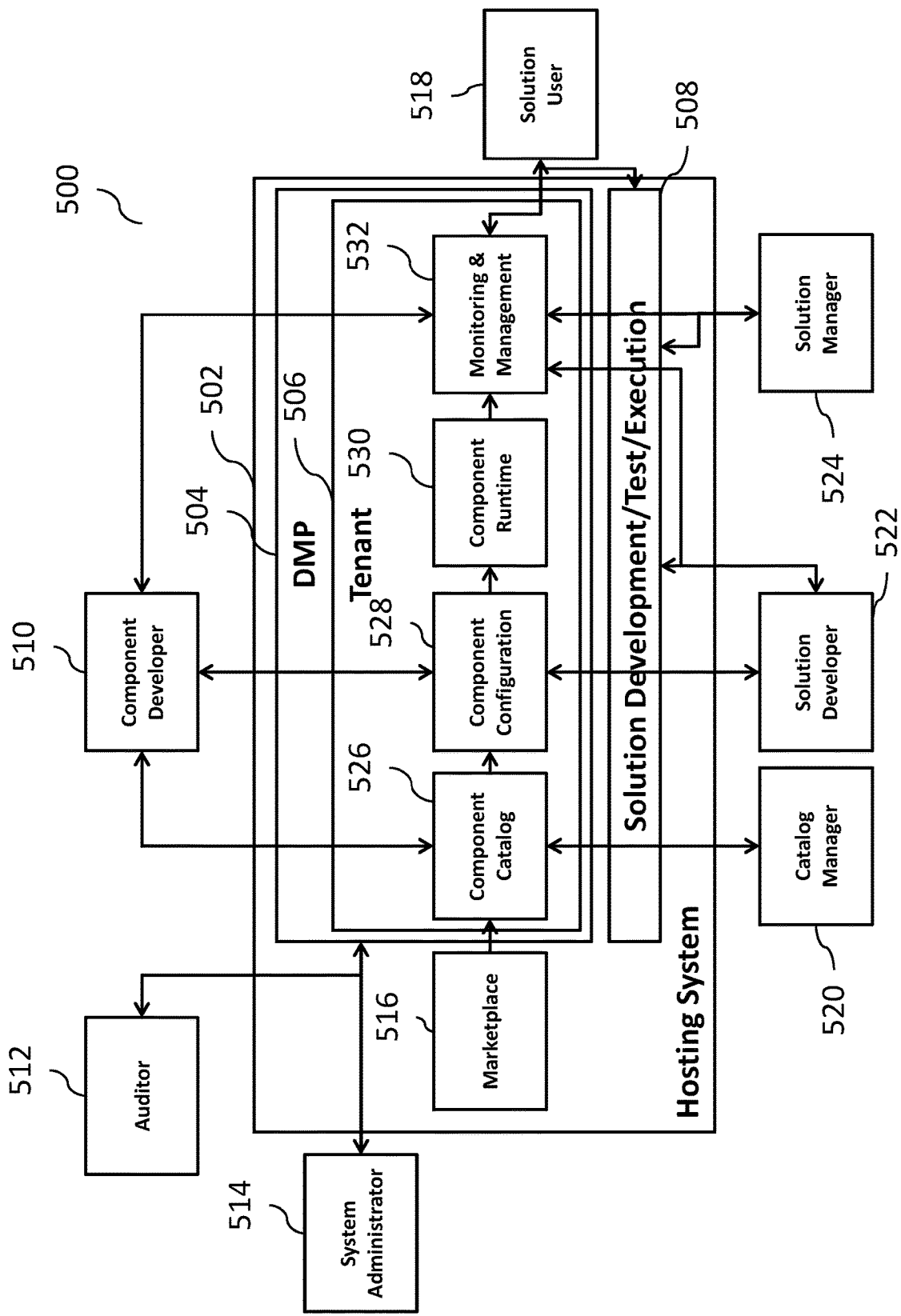
FIG. 5 illustrates an exemplary decision management platform system environment identifying such roles, according to some implementations of the current subject matter.

Each of the above components illustrated in FIG. 4 can be associated with one or more roles of the decision management platform. FIG. 5 illustrates an exemplary decision management platform system environment 500 identifying such roles, according to some implementations of the current subject matter. As shown in FIG. 5, the decision management platform 504 can be hosted using a hosting system 502, which can be an analytic cloud system (e.g., FICO Analytic Cloud) and/or can be hosted on premises, i.e., by a specific user's computing system. The hosting system 502 can also include a solution development/test/execution module 508 and a marketplace module 516. The marketplace module 516 can be a web-based catalog and store for discovering and purchasing decision management platform components and/or solutions. A marketplace repository can be associated with the marketplace module 516. The marketplace repository can store artifacts for the components and/or solutions that can be available through the decision management marketplace module 516.

The decision management platform 504 can include a specific tenant system (e.g., a user system) 506. The tenant system 506 can include a component catalog 526, a component configuration 528, a component runtime 530, and a monitoring and management 532. The component catalog 526 can be a listing of components that can be available for use in the decision management platform. Component configuration can be performed using a web application that can provide a user interface for configuring a decision management component. A configured component can be a decision management component that can be ready to be deployed, without additional manual configuration. A deployed component can be a decision management component that has been deployed into the runtime environment 408 (shown in FIG. 4) that can be accessed through its defined endpoints, where an endpoint can be an entry point to a component's decision service (e.g., a REST endpoint, a SOAP endpoint, etc.).

Various types of users (e.g., individuals, entities, software applications, etc.) can access and/or otherwise communicate with one or more components of the decision management platform 504 and/or component 508. These users can include a component developer 510, a catalog manager 520, a solution developer 522, a solution manager 524, a solution user 518, a system administrator 514 for decision management platform and/or for tenant, an auditor 512 for the decision management platform and/or for tenant.

The component developer 510 can be responsible for developing new components, submitting them for inclusion in the component catalog 526, configuring them, and monitoring their use. The catalog manager 520 can be responsible for approving/disapproving new/updated components of available components for inclusion in the component catalog 526. The solution developer 522 can develop solutions using various application development tools (e.g., such as business solutions builder 202 shown in FIG. 2).

The solution developer 522 can also search the component catalog 526 for behavior useful in the development of the solution and copy identified components to the configuration environment for various purposes, including customization. The developer 522 can configure/customize components per requirements of a solution under development as well as test and submit the solution and associated configured components for deployment. The developer 522 can also monitor deployed solutions.

The solution manager 524 can approve/disapprove solutions for deployment to the execution ecosystem and monitors their subsequent use.

The solution user 518 can be responsible for leveraging business functionalities provided by the deployed solution.

The system administrator 514 for the decision management platform can be responsible for monitoring and/or managing system resources used by the decision management platform. The system administrator for the tenant can be responsible for monitoring and/or managing system resources used by an individual tenant.

The auditor 512 for decision management platform can be responsible for ensuring that the decision management platform ecosystem complies with hosting organization's information technology policies, standards, laws, etc., e.g., Federal Information Security Act ("FISMA"), Payment Card Industry ("PCI"), Sarbanes-Oxley ("SOX"), etc. The auditor for the tenant can be responsible for ensuring that the decision management platform tenant's ecosystem complies with tenant organization's information technology policies, standards, laws, etc., e.g., FISMA, PCI, SOX, etc.

In some implementations, each tenant can have a secure, isolated environment for managing tenant-specific components, including: a repository for storing the tenant's copies of components, a registry of the tenant's components that can be queried for configuration specifics, a build and test system to ensure that tenant components function as anticipated, an execution ecosystem for deployed component instances, etc. The decision management platform can provide auto-scaling and load balancing capabilities that component owners can use to manage transaction volumes.

In some implementations, the tenant's component catalog 526 can include validated and/or approved versions of components. In some implementations, the tenant's component catalog 526 can include an associated graphical user interface that can allow users to browse available components, access their respective descriptive information and documentation, etc.

The component configuration 528 can allow users to customize components copied from the component catalog 526 for use in a targeted solution via a user interface that can be specific to the component.

The component runtime 530 can include a collection of runtime code/engines needed by the collection of deployed components, etc.

The monitoring and management element 532 can be responsible for capturing events generated by the runtime ecosystem. These event payloads can be logged/persisted in the decision management platform analytic datamart and can be subsequently available for adaptive control analysis, data exploration, simulation, model refresh, etc.

Referring back to FIG. 4, each of the environments 402-408 can be associated with a user interface 410, where each environment 402-408 can have a specific user interface that can be designed specifically for it. For example, the core environment 402 can include a core user interface 412; the catalog environment 404 can include a catalog user interface 414; the library environment 406 can include a library user interface 416; and a dashboard 418 can be associated with both the runtime environment 408 and the library environment 406. A specific processing interaction or flow 422 can be established between the environment 402-408, as indicated by various arrows in FIG. 4. Further, each environment 402-408 can be associated with specific decision management platform services 436. For example, the core environment 402 can include services 438 that can be associated with user registry, tenant registry, and a vendor registry. The catalog environment 404 can include services 440 that can be associated with catalog registry, and catalog repository. The library environment 406 can include services 442 that can be associated with solution and component registry, and access control. The runtime environment 408 can include services 444 that can be associated with runtime management, event logging, and access control.

A user can access the decision management platform and its components using various user interfaces. Each type of user, e.g., an application user, a tenant, a third party vendor, etc., can access the catalog 426 of components of the decision management platform. The components can be standalone components and/or part of an application and/or a particular solution. The catalog 426 can be accessed through a catalog user interface 414 associated with the catalog environment 404. When the catalog 426 is accessed, appropriate decision management platform services 436 associated with the catalog environment 404 can be triggered. Such services can include a catalog registry and a catalog repository 440. The services 440 can include various information about components, e.g., names, identifiers, description, compatibility, etc.

Once the user has selected a specific component and/or components, the flow 422 can proceed into the library environment, where components can be individually configured using component configuration 428. Component configuration can be performed using a component configuration user interface 420 that can be associated with a library user interface 416 of the library environment 406. Additionally, a solution, which can include the user-selected component, can be also configured using solution configuration 430. Solution configuration can be performed using library user interface 416. Configuration of the components and/or solution can be based on specific requirements, provided by the user, solution, other components, and/or other solutions, as well as parameters, and/or any other information. The library environment 406 can also trigger appropriate decision management platform services 436, which can include solution and component registry and access control 442. The services 442 can allow registration and/or storage of appropriate component and/or solution configuration information, so that during runtime an appropriate configuration of one or both is invoked. The access control service can monitor and/or control access to component(s) and/or solution(s) during configuration process.

Upon completion of the configuration of the component(s) and/or solution(s), the component(s) and/or solution(s) can be deployed in the runtime environment 408 using component runtime 432 and solution runtime 434, respectively. Runtime of components and/or solutions can be monitored using a dashboard 418, which can provide status of runtime execution of the components/solutions as well as any other information, and/or allow the user to make changes to the runtime process (e.g., stop, postpone, modify, etc., execution). During runtime, appropriate decision management platform services 436 can be invoked as well. These can include runtime management, event logging, and access control 444. Runtime management can allow the user to monitor and/or make any changes to the runtime execution of the component(s) and/or solution(s). Event logging service can log any execution events that may be occurring during execution of the component(s) and/or solution(s). The access control service can monitor and/or control access to component(s) and/or solution(s) during runtime.

In some implementations, the decision management platform components and prepackaged solutions can be first encountered by users in the catalog environment 404. When a user searches for and/or views a particular component using a catalog user interface 414, the component can be referred to as a "component prototype" and once selected for use by the user, the component can be added and/or instantiated to the library environment 406. The component can then be configured for use, included in one or more solutions, and mapped/deployed to the execution or runtime environment 408 when the solution is deployed.

In some implementations, the component can be a basic building block of an application hosted on the decision management platform. Various components can be grouped into solutions that represent sets of functionalities comprising a partial or complete application. Components and solutions can exhibit different behavior depending on where in the decision management platform ecosystem they are encountered. If the component is encountered in the catalog environment 404, the component and/or preconfigured solution prototype can present its meta-information in response to various inquiries. The meta-information can include, but is not limited to, a name, a version, vendor information, a description, search tags, etc. If the component is encountered in the library environment 406, a configuration editor can be provided to the user for allowing the user to perform configuration of the component using component configuration user interface 420. If the component is encountered in the runtime environment 408, the decision management platform can provide a mechanism through which instances of the configured component and solution can be started and thereafter invoked by various client routines.

In some implementations, component and/or solution instances, after being partially or wholly configured, can be repackaged and/or published back to the catalog, where they can be instantiated and further configured accordingly to the needs of their respective target solution. In some implementations, a specific component model can be for the components in the decision management platform. Components can have a well-defined structure and behavioral model within each of the environments in which they are exposed. The environments can include the catalog environment 404, the library environment 406, and the runtime environment 408. As a component "makes its way" through each environment (i.e., from the catalog environment 404 to library environment 406 to runtime 4 environment 08), its metamodel can be populated with various metadata information, which can include information associated with the component prototype (in the catalog environment 404), information associated with the configured component (in the library environment 406), and information associated with the runtime component (in the runtime environment 408).

The information associated with the prototype component in the catalog environment 404 can include component descriptor information, component configurator information, service implementation, static resources, static configuration information. The component descriptor information can include a basic descriptor information, dependencies descriptor information (all of the services that are required for a component to operate), endpoints descriptor information (the services that a component provides), and configuration descriptor information (all of the metadata that is required to operate). The custom configurator can include information about any custom user interfaces (e.g., HTML5, etc.) that may be required and any configuration controller information (e.g., REST, etc.)

As stated above, once the component has been identified by the user (i.e., a component prototype), the prototype component becomes a configured component in the library environment 406. The configured component metadata information can include information concerning configuration choices, instance-specific resources, e.g., files, resolved dependencies to other component(s) and/or solution(s) and/or their resources.

In the runtime environment 408, the configured component can be deployed. During deployment, the runtime component can be associated with various persisted data, resources and/or other state information that can be collected by the component during its execution. The metadata information can also include runtime endpoint information.

Figure 6:
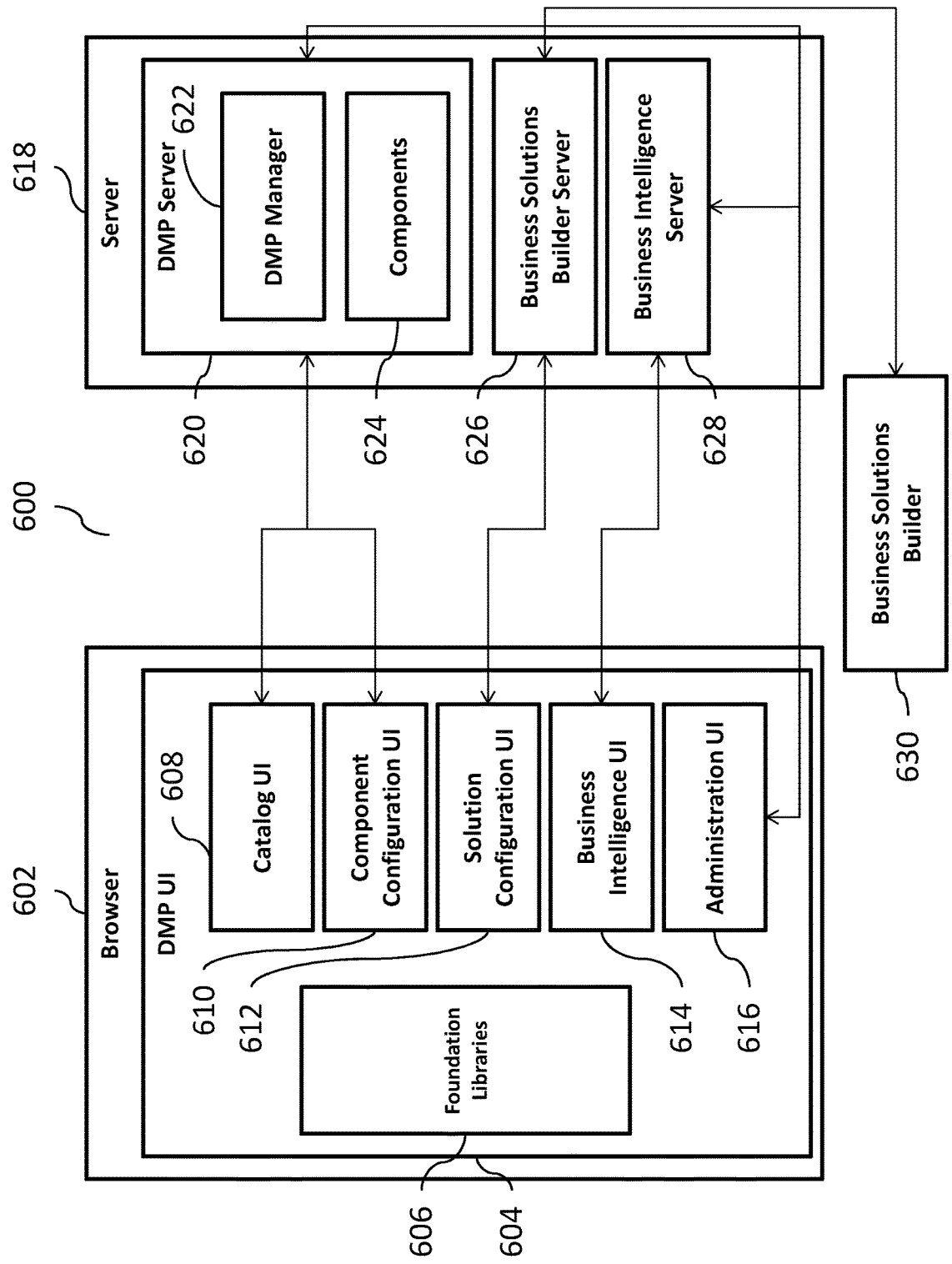
FIG. 6 illustrates an exemplary decision management platform user interface architecture, according to some implementations of the current subject matter.

FIG. 6 illustrates an exemplary decision management platform user interface architecture 600, according to some implementations of the current subject matter. The user interface can provide various capabilities to the user, which can include marketplace usage and management, component configuration, solution creation and configuration, business intelligence related configuration and exploration, and system administration and auditing. Appropriate application programming interfaces and communication protocols (e.g., REST protocol as well as any other protocol can be used) can be used to provide interaction between the decision management platform user interface and decision management platform servers hosting requisite information (e.g., component information, component configuration information, etc.).

As shown in FIG. 6, a browser 602 can be used to display a decision management platform user interface 604. The user interface 604 can leverage various information from foundation libraries 606. Some exemplary libraries can include jQuery, Knockout, Bootstrap, D3, and others. The user interface can provide capabilities to the user to search for specific components via a catalog user interface 608, which can be displayed in the browser 602. The user can also perform component configuration using component configuration user interface 610. Solution configuration can be performed using solution configuration user interface 612. Various business intelligence aspects that can be associated with components, solutions, environments, etc. can be handled using a business intelligence user interface 614. Administrative tasks can be accomplished using an administration user interface 616. Each of the user interfaces 608-616 can be displayed one at a time, in groups, and/or simultaneously.

When a specific user interface is requested and/or displayed, a server 618 can provide an appropriate information corresponding to that user interface. The server 618 can include a decision management platform server 620, which includes a decision management platform manager 622 and components 624 (as discussed above and shown in FIG. 2). The decision management platform server 622 can provide information for display in the catalog user interface 608 and component configuration user interface 610. Additionally, the administration user interface 616 can access the decision management platform server 620 to perform various administrative tasks.

The server 618 can also include a business solutions builder server 626 that can provide information for display in the solution configuration user interface 612. The business solutions builder server 626 can communicate with the business solutions builder component 630 (similar to the business solutions builder 202 shown in FIG. 2) to obtain appropriate information for display in the user interface 612. The administration user interface 616 can be used to perform various administrative tasks associated with the business solutions builder server 626.

Further, the server 618 can include a business intelligence server 628 that can be used to provide information for display in the business intelligence user interface 614. Also, the administration user interface 616 can be used to perform various administrative tasks associated with the business intelligence server 628.

In some implementations, the decision management platform can provide various levels of security, authentication, and/or authorization for the purposes of accessing, configuring, and/or deploying of components and/or solutions hosted by the decision management platform. The security can be provided to enable a third party to use a service created using the decision management platform, to authenticate a user of the decision management platform catalog, display protected resources of the decision management platform to an authenticated and/or authorized user, allow user login to access various components of the decision management platform. The users can be software engineers, software vendors, tenants, and/or any other users.

Figure 7:
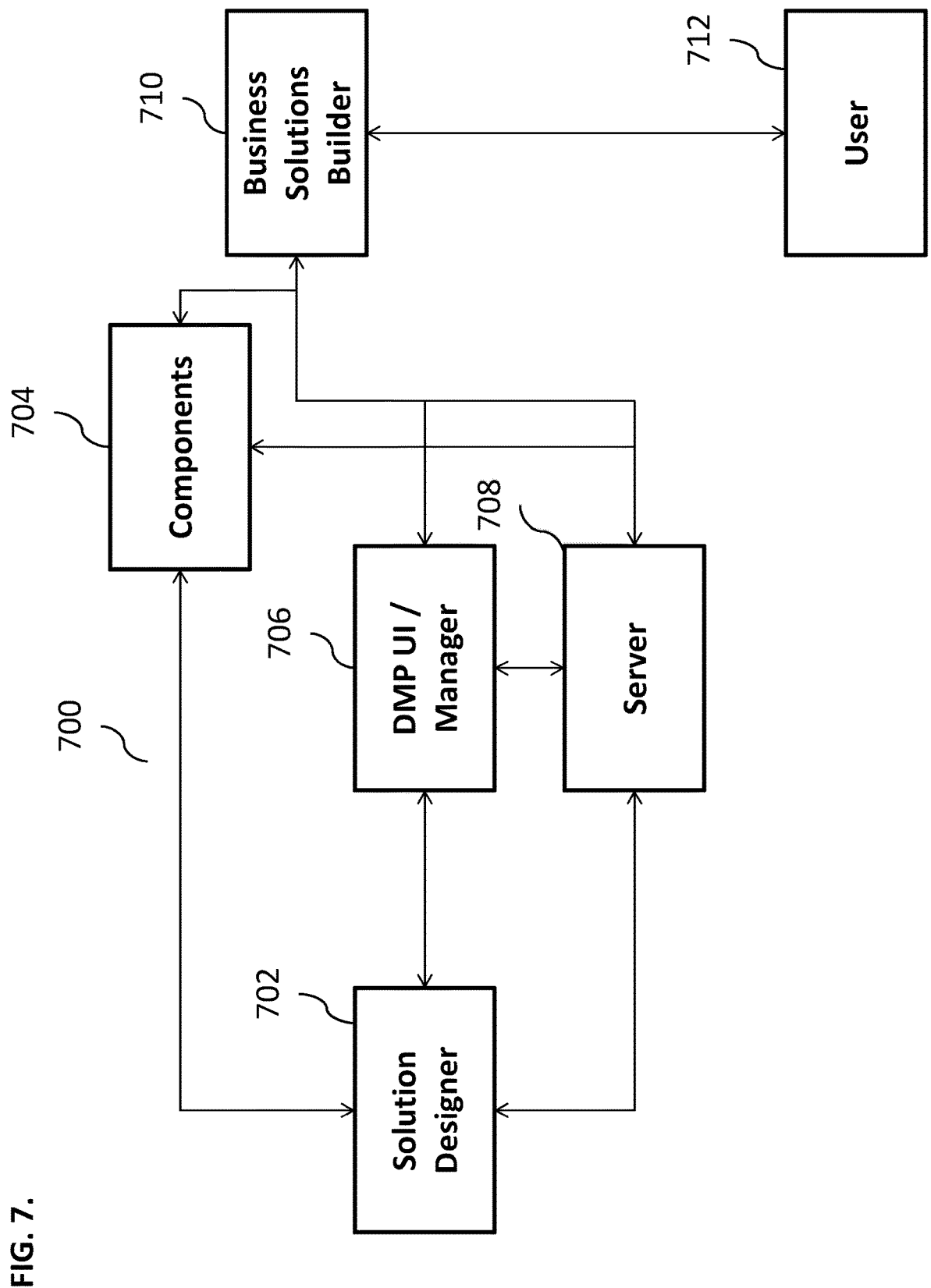
FIG. 7 illustrates an exemplary architecture for providing authentication and/or authorization for the decision management platform, according to some implementations of the current subject matter.

FIG. 7 illustrates an exemplary architecture 700 for providing authentication and/or authorization for the decision management platform, according to some implementations of the current subject matter. In some implementations, the architecture 700 can provide security for the decision management platform and/or its users (e.g., third party users, solution designers, etc.) through use of various authentication and/or authorization protocols, software, and/or solutions, e.g., OpenAM, available from ForgeRock, San Francisco, Calif., USA; SAML (Security Assertion Markup Language which is an XML-based open standard data format for exchanging authentication and authorization data between parties, in particular, between an identity provider and a service provider), as developed by the OASIS Security Services Technical Committee, OAuth, OAuth2, and/or any others.

The system 700 can include an authentication/authorization server 708 (or a plurality of different servers 708) that can use various authentication/authorization communications protocols to communicate with the solution designer 702, components database 704, decision management platform manager/user interfaces 706, and a business solutions builder 710 (which is similar to the business solutions builder 202 shown in FIG. 2). The server 708 can provide the requisite security to the components 704 and the decision management platform manager 706. Thus, in order for a user 712 (e.g., a third party user, application, component, solution, etc.) to gain access to the components (and/or solutions) database available in the decision management platform, the user 712 can be required to obtain appropriate credentials (e.g., register with the system, provide authentication information (e.g., user name, password, etc.), etc.) and/or submit these credential for authentication/authorization to the server 708. Upon obtaining an appropriate permission from the server 708, the user 712 can be allowed to access the components and/or other parts of the decision management platform, if appropriate. The user 712 can be granted various levels of security, which can allow/prevent the user from accessing certain components, solutions, parts, etc. of the decision management platform.

Figure 8:
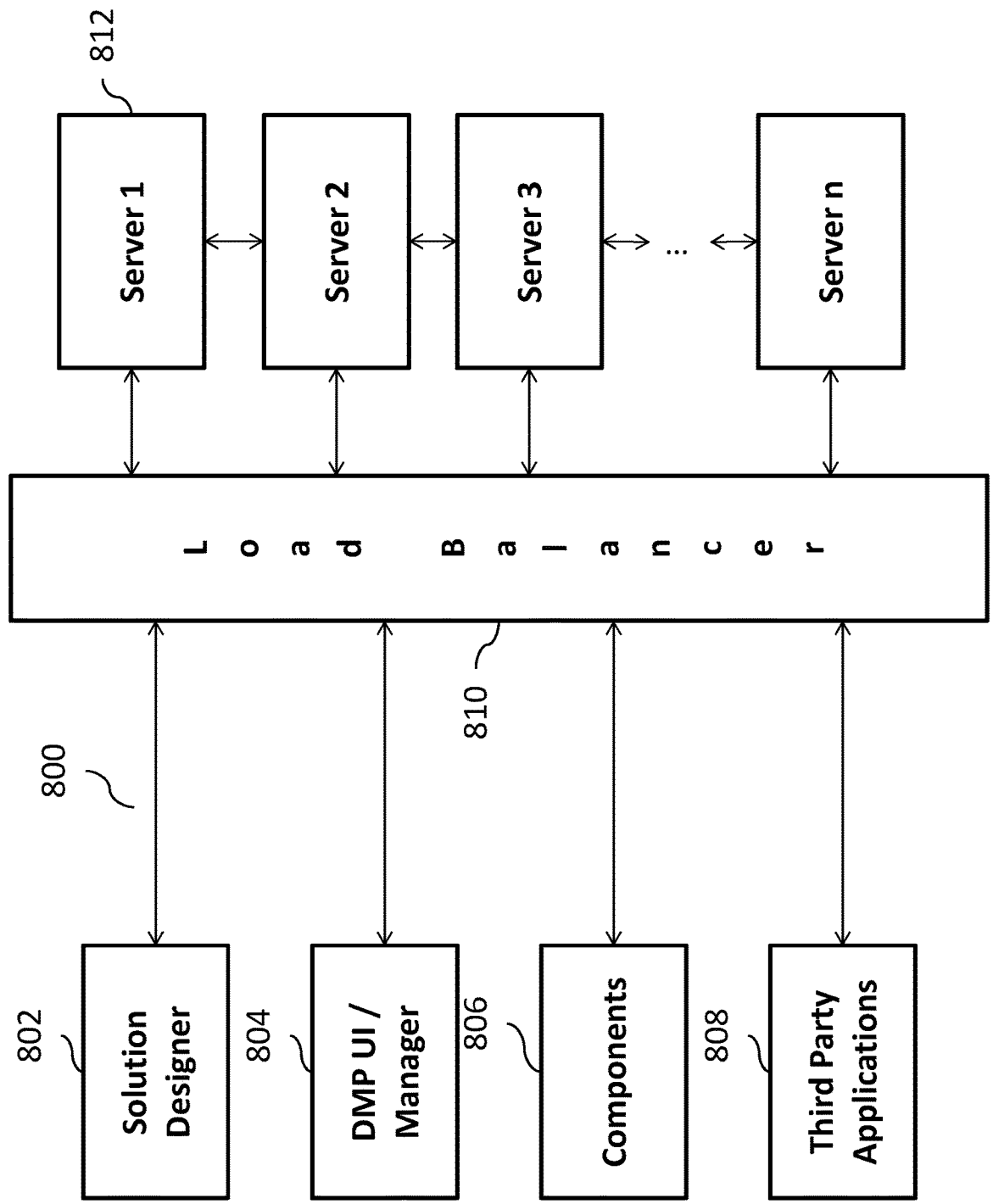
FIG. 8 illustrates an exemplary architecture for providing authentication and/or authorization for the decision management platform using one or more authentication/authorization servers, according to some implementations of the current subject matter

In some implementations, authentication and/or authorization can be provided by a plurality of servers in order to accommodate a plurality of users trying to access the decision management platform. FIG. 8 illustrates an exemplary architecture 800 for providing authentication and/or authorization for the decision management platform using one or more authentication/authorization servers, according to some implementations of the current subject matter. The system 800 can include a solution designer 802, a decision management platform user interface/manager 804, a components database 806, third party applications 808, a load balancer 810, and a plurality of servers 1, 2 . . . n, 812. The system 800 can operate similar to the system 700 shown in FIG. 7. The load balancer 810 can provide appropriate balancing of authentication/authorization resources among servers 812. This can ensure an uninterrupted access to the decision management platform system.

Figure 10:
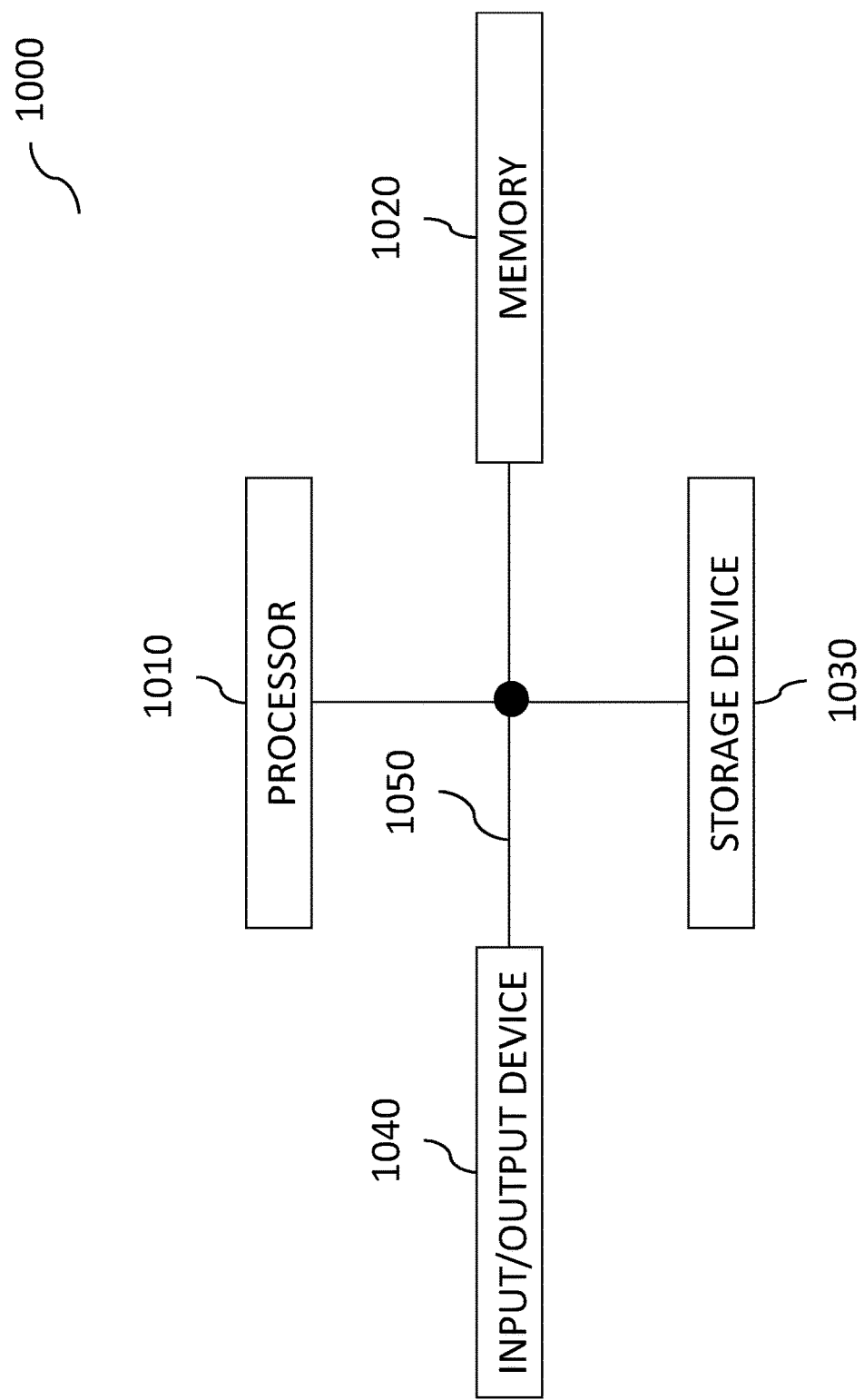
FIG. 10 is an exemplary system, according to some implementations of the current subject matter.

In some implementations, the current subject matter can be configured to be implemented in a system 1000, as shown in FIG. 10. The system 1000 can include a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
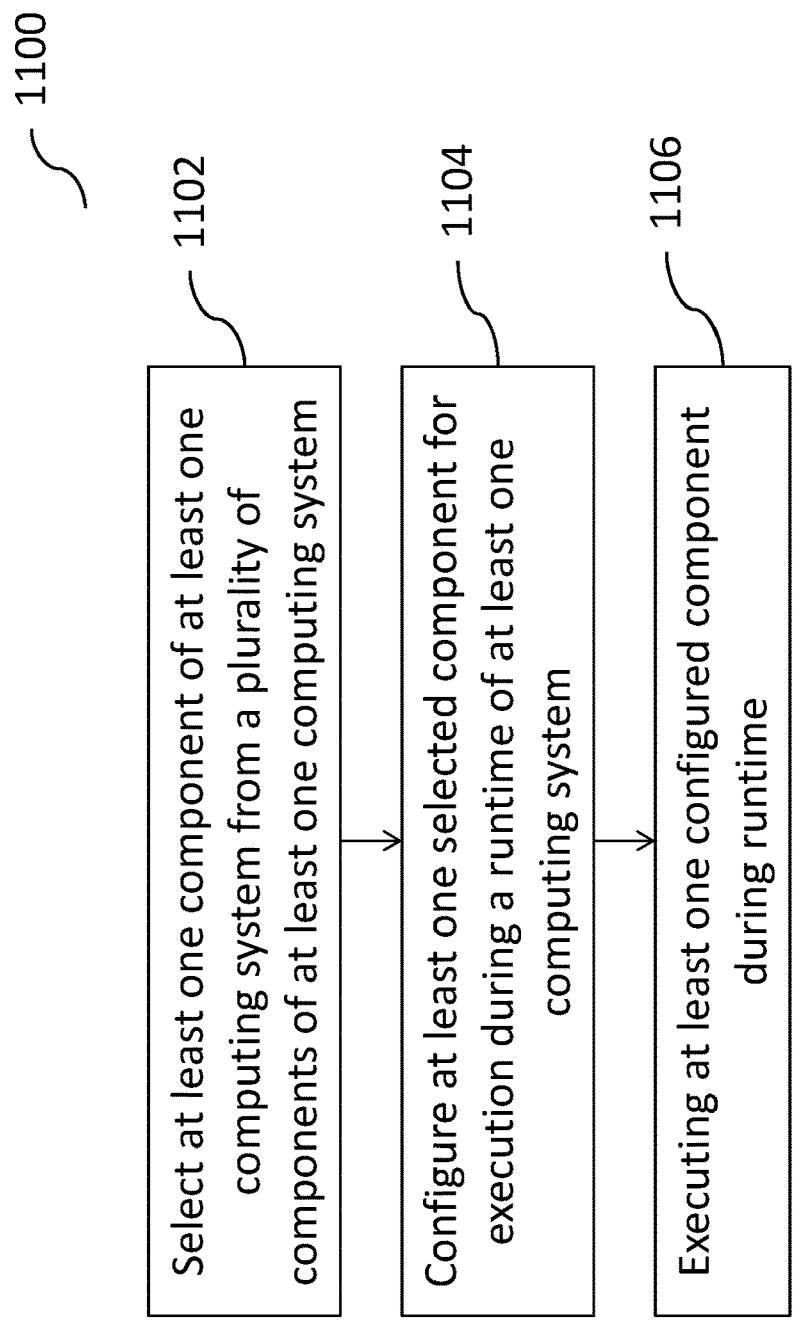
FIG. 11 is an exemplary method, according to some implementations of the current subject matter.

FIG. 11 illustrates an exemplary method 1100 that can be performed by the decision management platform, according to some implementations of the current subject matter. At 1102, at least one component of at least one computing system can be selected from a plurality of components of at least one computing system. At 1104, the selected component can be configured for execution during a runtime of the computing system. At 1106, the configured component can be executed during runtime.

In some implementations, the current subject matter can include one or more of the following optional features. In some implementations, the plurality of components of the computing system can be stored in a catalog module based on at least one characteristic. The characteristic can include at least one of the following: analytics, decisioning, identity and access management, and optimization.

In some implementations, a computing solution can include at least one component. The computing solution can be also configured. Further, the computing solution and the component can be configured separately.

In some implementations, the computing system can include at least one of the following: a catalog computing environment, a library computing environment, and the runtime computing environment. The computing component can be selected in the catalog computing environment, configured in the library computing environment, and executed in the runtime computing environment. Further, a first user interface can be associated with the catalog computing environment for selecting the component. A second user interface can be associated with the library computing environment for configuring the selected component. A third user interface can be associated with the runtime computing environment for managing and monitoring execution of the configured component.

In some implementations, the component can include at least one dependency on at least another component in the plurality of components of the computing system. The component can be executed in accordance with the dependency on another component.

In some implementations, the method can include providing lifecycle management for the component by maintaining at least one artifact associated with the component.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer implemented method comprising:

configuring a computing component in a plurality of computing components of an enterprise computing solution based on at least one component model and at least one requirement of the enterprise computing solution for execution during runtime of a computing system;

determining at least one key performance indicator related to execution of the computing component of the enterprise computing solution, each key performance indicator includes one or more a user-defined key performance indicator and is determined based on a previous runtime of the computing system;

allocating at least one computing resource, based on the determined key performance indicator, for execution of the configured computing component; and executing, based on the allocating, the configured computing component, the executing being constrained by the determined key performance indicator, the computing component configuration and a prototype definition of the computing component, the configured computing component is dependent on at least one environment associated with the computing system, the at least one environment includes at least one of the following: a catalog computing environment, a library computing environment, and a runtime computing environment;

wherein the computing component is selected in the catalog computing environment, configured in the library computing environment, and executed in the runtime computing environment;

wherein
- a first user interface is associated with the catalog computing environment for selecting the computing component;
- a second user interface is associated with the library computing environment for configuring the selected computing component; and
- a third user interface is associated with the runtime computing environment for managing and monitoring execution of the configured computing component;

the plurality of computing components is stored in a catalog module based on at least one characteristic, wherein the at least one characteristic includes at least one of the following: analytics, decisioning, identity and access management, and optimization.

2. The method according to claim 1, wherein the allocating further comprises allocating the at least one computing resource based on a user-defined criteria.

3. The method according to claim 1, wherein the computing component includes at least one dependency on another computing component in the plurality of computing components of the computing system.

4. The method according to claim 3, wherein the computing component is executed in accordance with the at least one dependency on the at least another computing component.

5. A system comprising:
at least one programmable processor; and
a machine-readable medium storing instructions executed by the at least one programmable processor cause the at least one programmable processor to perform operations comprising:
configuring a computing component in a plurality of computing components of an enterprise computing solution based on at least one component model and at least one requirement of the enterprise computing solution for execution during runtime of a computing system;
determining at least one key performance indicator related to execution of the computing component of the enterprise computing solution, each key performance indicator includes a user-defined key performance indicator and is determined based on a previous runtime of the computing system;
allocating at least one computing resource, based on the determined key performance indicator, for execution of the configured computing component; and
executing, based on the allocating, the configured computing component, the executing being constrained by the determined key performance indicator, the computing component configuration and a prototype definition of the computing component, the configured computing component is dependent on at least one environment associated with the computing system, the at least one environment includes at least one of the following: a catalog computing environment, a library computing environment, and a runtime computing environment;
wherein the computing component is selected in the catalog computing environment, configured in the library computing environment, and executed in the runtime computing environment;

wherein
- a first user interface is associated with the catalog computing environment for selecting the computing component;
- a second user interface is associated with the library computing environment for configuring the selected computing component; and
- a third user interface is associated with the runtime computing environment for managing and monitoring execution of the configured computing component;

the plurality of computing components is stored in a catalog module based on at least one characteristic, wherein the at least one characteristic includes at least one of the following: analytics, decisioning, identity and access management, and optimization.

6. The system according to claim 5, wherein the allocating further comprises allocating the at least one computing resource based on a user-defined criteria.

7. The system according to claim 5, wherein the computing component includes at least one dependency on another computing component in the plurality of computing components of the computing system.

8. The system according to claim 7, wherein the computing component is executed in accordance with the at least one dependency on the at least another computing component.

9. A computer program product comprising a non-transitory machine-readable medium storing instructions executed by at least one programmable processor cause the at least one programmable processor to perform operations comprising:
configuring a computing component in a plurality of computing components of an enterprise computing solution based on at least one component model and at least one requirement of the enterprise computing solution for execution during runtime of a computing system;
determining at least one key performance indicator related to execution of the computing component of the enterprise computing solution, each key performance indicator includes a user-defined key performance indicator and is determined based on a previous runtime of the computing system;
allocating at least one computing resource, based on the determined key performance indicator, for execution of the configured computing component; and
executing, based on the allocating, the configured computing component, the executing being constrained by the determined key performance indicator, the computing component configuration and a prototype definition of the computing component, the configured computing component is dependent on at least one environment associated with the computing system, the at least one environment includes at least one of the following: a catalog computing environment, a library computing environment, and a runtime computing environment;
wherein the computing component is selected in the catalog computing environment, configured in the library computing environment, and executed in the runtime computing environment;

wherein
- a first user interface is associated with the catalog computing environment for selecting the computing component;

a second user interface is associated with the library computing environment for configuring the selected computing component; and a third user interface is associated with the runtime computing environment for managing and monitoring execution of the configured computing component;

the plurality of computing components is stored in a catalog module based on at least one characteristic, wherein the at least one characteristic includes at least one of the following: analytics, decisioning, identity and access management, and optimization.

10. The computer program product according to claim 9, wherein the allocating further comprises allocating the at least one computing resource based on a user-defined criteria.

11. The computer program product according to claim 9, wherein the computing component includes at least one dependency on another computing component in the plurality of computing components of the computing system.

12. The computer program product according to claim 11, wherein the computing component is executed in accordance with the at least one dependency on the at least another computing component.

* * * * *